Nov. 11, 1958
L. D. TEST
2,860,242
DIFFERENTIAL PULSE HEIGHT DISCRIMINATOR
Filed Feb. 8, 1955
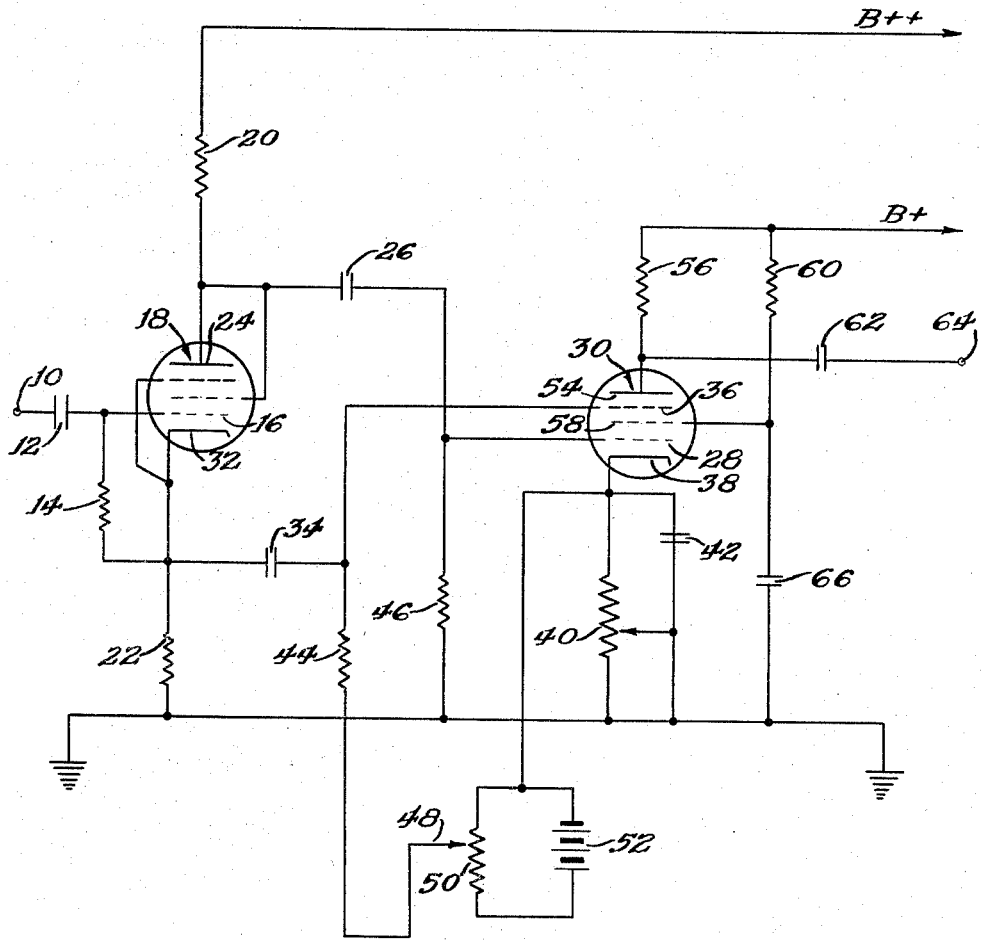
INVENTOR.
Louis D. Test
BY
Roland A. Anderson
Attorney United States Patent Office 2,860,242
Patented Nov. 11, 1958

2,860,242

DIFFERENTIAL PULSE HEIGHT DISCRIMINATOR

Louis D. Test, Richland, Wash., assignor to the United States of America as represented by the United States Atomic Energy Commission Application February 8, 1955, Serial No. 487,006

3 Claims. (Cl. 250—27)

This invention relates to pulse height discriminators and more specifically to differential pulse height discriminators, which are adapted to respond to pulses of a range or band of amplitudes, but to reject pulses of amplitudes greater or less than the preselected range or band.

Pulse height discriminators, frequency called pulse height selectors, are used for a variety of purposes, principally in discriminating against or rejecting pulses or other electrical signals of an amplitude smaller than the amplitude of the desired signals. Examples of the use of simple pulse height selectors are found in various types of pulse communication equipment to discriminate against background or noise pulses. An even more common example of the use of pulse height discriminators is found in the radioactivity measuring arts wherein the use of a pulse height discriminator is almost universal in connection with the counting of electrical pulses produced by various kinds of radioactivity in nuclear particle and radiation detectors. Such discriminators are used virtually universally to distinguish the pulses produced by alpha particles or the fission process from pulses produced by, for example, beta and gamma rays. This type of pulse height discriminator is relatively simple, requiring merely the suppression of all pulses below a preselected level and the passing of those exceeding the preselected level. A more refined application of the pulse height discriminator in radioactivity and nuclear particle detection and counting lies in the so-called "differential" pulse height discriminator wherein the device rejects not only the pulses below the selected amplitude level, but in addition rejects pulses greater in amplitude than a higher preselected level, thus passing only a band of amplitudes lying within preselected limits. This type of device sometimes consists of a pair of simple pulse height selectors set for different amplitudes, together with suitable anticoincidence circuitry, such that an output pulse is produced only when there are received pulses which are inadequate in amplitude to actuate the higher level discriminator, but adequate to actuate the lower level discriminator. Such systems are in use for a number of applications, notably in the analysis of the radiation spectra of materials for the purpose of routine analysis of materials or of research upon the spectra themselves.

The present invention provides a differential pulse height discriminator which is far simpler than those heretofore available. The simplicity of the present device, as evidenced by the reduced number of components required to produce an efficient and effective differential pulse height discriminator, results in considerable diminution of cost without sacrifice of performance.

In general, the embodiment of the invention hereinafter to be disclosed incorporates an electron tube having a plurality of grids adapted to cut off plate current in the tube upon the application of sufficient negative voltage thereto, means for biasing only one of said grids beyond such cutoff, means for applying to said one grid a positive pulse proportional in amplitude to each pulse under measurement, and means for simultaneously applying to the other grid a negative pulse proportional in amplitude to the pulse under measurement. In this manner, the tube conducts only during pulses under measurement which are of sufficient amplitude to drive the one grid positive with respect to cutoff, but of insufficient amplitude to drive the other grid negative with respect to cutoff. Although the invention is illustrated with a vacuum tube, it will also be seen that the same principles of operation as those employed in the illustrated embodiment of the invention may be adapted to other controlled current devices, such as transistors, having a charge-emitting electrode, a charge-collecting electrode, and control electrodes adapted to cut off current between the emitting electrode and the collecting electrode.

More complete understanding of the invention will best be obtained from consideration of the single figure of the drawing, which is a schematic electrical diagram of an embodiment of the invention.

In the illustrated embodiment, there is provided an input terminal 10, coupled by means of a coupling condenser 12 and a grid resistor 14 to the control grid 16 of a triode-connected pentode tube 18 having identical plate and cathode load resistors 20 and 22, respectively, the former being connected to a B++ supply. The plate 24 is coupled by a coupling condenser 26 to the first grid (sometimes called "signal grid") 28 of a gated beam amplifier tube 30. The cathode 32 of the tube 18 is coupled by a condenser 34 to the other control grid (sometimes called the "quadrature grid") 36 of the gated beam tube 30. The cathode 38 or current return electrode of the tube 30 is returned to ground through a rheostat-connected potentiometer 40 shunted by a by-pass condenser 42. The quadrature grid 36 and the signal grid 28 are provided with grid resistors 44 and 46. The grid resistor 46 is returned to ground and the grid resistor 44 is returned to the tap 48 on a potentiometer 50 connected across a positive bias supply 52, the negative terminal of the bias supply 52 being connected directly to the cathode 38. The plate 54 of the tube 30 is provided with a plate load resistor 56 connected to the B+ supply, to which the accelerator grid 58 is also connected by a dropping resistor 60. The plate 54 is coupled by a coupling condenser 62 to the output terminal 64 of the discriminator. The accelerator grid 58 is by-passed to ground by a condenser 66.

The circuits and the components thereof being thus described, the manner of operation will readily be understood by those skilled in the art in view of what has been said above concerning the general teachings of the invention. The tube 18 serves as a phase-splitter, producing substantially identical outputs of opposite polarity in response to a pulse introduced at the input terminal 10. With the manner of coupling shown, the circuit is designed for the introduction of pulses at the input terminal 10 which are negative in polarity, thus producing positive pulses at the plate 24, coupled to the signal grid 28, and negative pulses at the cathode 32, coupled to the quadrature grid 36. Signal grid 28 is biased beyond plate current cutoff by the voltage drop in the cathode resistor 40 due to cathode current from the accelerator grid 58. (In a gated beam amplifier tube the accelerator current is not cut off by the cutting off of plate current by means of the signal and quadrature grids.) Thus no plate current flows in the tube 30 unless and until the positive pulse at the plate of the phase-splitter 18 is sufficient in amplitude to drive the grid 28 positive with respect to cutoff. The quadrature grid is biased positive with respect to the cathode by the supply 52 and potentiometer 50. If the amplitude of the negative pulse impressed on the quadrature grid 36 is sufficient to drive the quadrature grid negative with respect to cutoff (i. e. if the pulse is of greater amplitude than the sum of the positive bias and the negative potential corresponding to cutoff), the tube 30 will not conduct plate current, even though grid 28 no longer prevents such conduction. There thus appear at the output terminal 64 negative pulses only in response to negative pulses at the input terminal 10 which are of sufficient amplitude to drive the signal grid positive with respect to cutoff, but of insufficient amplitude to drive the quadrature grid 36 negative with respect to cutoff. Adjustment of the potentiometer 40 determines the minimum amplitude of input pulse which will produce a pulse at the output and adjustment of the potentiometer tap 48 determines the maximum amplitude which will produce an output pulse. There is thus provided a differential pulse height discriminator of extremely simple construction using a minimum of components which may be readily adjusted both as to band width of accepted pulse amplitudes and as to the level of accepted pulse amplitudes. It may be observed in passing that, in the case of amplitudes exceeding the amplitudes which the circuit is set to pass, there will be instantaneous conduction during the rise time and the fall time of the pulses. However, this effect, although theoretically present, is negligible when the input pulses are shaped so as to have fast rise and decay times and, in any event, produces no observable effect on ordinary succeeding circuits.

Circuit components and values which have been found suitable for the illustrated embodiment of the invention are as follows: Tube 18 is a 6AK5 and tube 30 is a 6BN6. The B+ voltage is 105 volts and the B++ voltage is 255 volts. The condenser 12 is 250 $\mu\mu$f. and the condensers 26, 34 and 62 are 40 $\mu\mu$f. The condensers 42 and 66 are .01 $\mu$f. The resistors 20 and 22 are 4700 ohms and the resistors 14, 44 and 46 are 1 megohm. The resistor 40 is 5000 ohms and the resistor 56 10,000 ohms, the resistor 60 being 33,000 ohms.

Persons skilled in the art will, of course, readily adapt the general teachings of the invention to embodiments far different than the embodiment illustrated. Accordingly, the scope of the protection afforded the invention should not be limited to the particular embodiment thereof shown in the drawing and described above, but shall be determined only in accordance with the appended claims.

What is claimed is:

1. A differential pulse height discriminator for electrical pulses comprising a phase-splitting amplifier having an input and a pair of outputs of opposite phase, a gated beam amplifier tube having a plate, a current return electrode, an accelerating electrode, and first and second grids each adapted to cut off current between plate and return electrode of said tube by the application of voltage negative with respect to the return electrode, means for biasing the first of the grids positive under quiescent conditions with a predetermined constant voltage, a current source having a positive terminal connected to the plate and to the accelerating electrode and a negative terminal connected to the return electrode through a bias resistor and a bypass capacitor in parallel therewith, means interconnecting the second grid and the return electrode including the bias resistor and the bypass capacitor, whereby the second grid is biased negatively with respect to the return electrode, a coupling between the first grid and one of the outputs of the phase-splitting amplifier, a coupling between the second grid and the other output of the phase-splitting amplifier, and a load impedance in the plate circuit of the gated beam amplifier tube, whereby a voltage pulse appears across the plate load impedance only in response to pulses at the input of the phase-splitting amplifier which are of an amplitude insufficient to drive the first grid negative beyond cutoff, but sufficient to drive the second grid less negative than cutoff.

2. A differential pulse-height discriminator for electrical pulses comprising a phase-splitting amplifier having an input and a pair of outputs of opposite phase, a gated beam amplifier tube having a plate, a cathode, an accelerator electrode, a quadrature grid, and a signal grid, the quadrature and signal grids each adapted to cut off current between plate and cathode of said tube by the application of voltage negative with respect to the cathode, a capacitor connected between one of the outputs of the phase-splitting amplifier and the quadrature grid, a capacitor connected between the other output of the phase-splitting amplifier and the signal grid, a direct current source having a positive terminal connected to the plate through a plate resistor and a negative terminal connected to the cathode through a bias resistor and a bypass capacitor in parallel therewith, a voltage dropping resistor connected between the accelerating electrode and the positive terminal of the direct current source, a predetermined constant biasing means under quiescent conditions having a positive terminal connected to the quadrature grid and a negative terminal connected to the cathode, and a grid resistor connected between the signal grid and the negative terminal of the direct current source, whereby the signal grid is biased negatively.

3. A differential pulse height discriminator for electrical pulses comprising a phase-splitting amplifier having an input and a pair of outputs of opposite phase, a gated beam amplifier tube having a plate, a cathode, a signal grid, an accelerator grid, and a quadrature grid, the signal grid and the quadrature grid each being adapted to cut off current between the plate and the cathode of said tube by the application of a voltage which is negative with respect to the cathode, a first differentiating circuit connected between one of the outputs of the phase-shifting amplifier and the quadrature grid, a second differentiating circuit connected between the other output of the phase-shifting amplifier and the signal grid, a direct current source having a positive terminal connected to the plate through a plate resistor and a negative terminal connected to the cathode through a cathode bias resistor and a bypass capacitor in parallel therewith, a resistor connected between the accelerator grid and the positive terminal of the direct current source, and a predetermined constant biasing means under quiescent conditions having a positive terminal connected to the quadrature grid and a negative terminal connected to the cathode, the positive voltage on the acceleraor grid being sufficient to cause current to flow from the accelerator grid to the cathode and through the cathode bias resistor at all times thereby making the cathode positive with respect to the signal grid and cutting off plate-to-cathode current under quiescent conditions, and the constant biasing means on the quadrature grid being insufficient to cause plate-to-cathode current under quiescent conditions but sufficient to cause plate-to-cathode current when the signal grid is driven positive with respect to the cathode.

References Cited in the file of this patent

UNITED STATES PATENTS

| | | |
|---|---|---|
| 2,158,261 | Urtel et al. | May 16, 1939 |
| 2,344,699 | Hunt | Mar. 21, 1944 |
| 2,519,763 | Hoglund | Aug. 22, 1950 |
| 2,648,766 | Eberhard | Aug. 11, 1953 |
| 2,743,363 | Mautner et al. | Apr. 24, 1956 |
| 2,752,490 | Rothstein | June 26, 1956 |
| 2,789,267 | Beal et al. | Apr. 16, 1957 |